(12) United States Patent
Fiesel

(10) Patent No.: US 12,129,921 B2
(45) Date of Patent: Oct. 29, 2024

(54) VEHICLE TRANSMISSION WITH A LUBRICATION SYSTEM AND A CONNECTION FOR ATTACHING A POWER TAKE-OFF MODULE TO THE VEHICLE TRANSMISSION

(71) Applicant: ZF Friedrichshafen AG, Friedrichshafen (DE)

(72) Inventor: Sascha Fiesel, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/667,772

(22) Filed: Feb. 9, 2022

(65) Prior Publication Data

US 2022/0268354 A1 Aug. 25, 2022

(30) Foreign Application Priority Data

Feb. 11, 2021 (DE) ...................... 10 2021 201 286.8

(51) Int. Cl.
*F16H 57/04* (2010.01)
*B60K 25/06* (2006.01)

(52) U.S. Cl.
CPC ......... *F16H 57/0435* (2013.01); *B60K 25/06* (2013.01); *F16H 57/0467* (2013.01)

(58) Field of Classification Search
CPC .. F16H 57/0435; F16H 57/0467; B60K 25/06
See application file for complete search history.

(56) References Cited

U.S. PATENT DOCUMENTS

| 3,540,297 A | 11/1970 | Wagner et al. |
| 5,228,355 A | 7/1993 | Smith et al. |
| 7,765,884 B2 | 8/2010 | Frait et al. |

(Continued)

FOREIGN PATENT DOCUMENTS

| CN | 210371947 U | * | 4/2020 | ......... F16H 57/0404 |
| CN | 215293531 U | * | 12/2021 | |

(Continued)

OTHER PUBLICATIONS

German Search Report Corresponding to 10 2021 201 286.8 mailed Aug. 25, 2021.

(Continued)

*Primary Examiner* — Minh Truong
(74) *Attorney, Agent, or Firm* — Finch & Maloney PLLC

(57) ABSTRACT

A vehicle transmission (1) which comprises a lubrication system and a connection for attaching a power take-off module (9) to the vehicle transmission. The lubrication system is designed to lubricate the vehicle transmission and the power take-off module (9). The lubrication system has a pressure feed (13) and a lubricant line (12) fed with lubricant from the pressure feed. By way of a first section (12A), the lubricant line (12) leads to at least one lubrication point of the vehicle transmission and, by way of a second section (12B), to a lubricant tapping point (15) of the vehicle transmission for the power take-off module. A throttle (17) and a first valve (18), connected parallel to the throttle, are arranged in the second section (12B). The first valve (18) is designed to open toward the lubricant tapping point if the lubricant pressure rises to a first pressure level.

9 Claims, 2 Drawing Sheets

(56) References Cited

U.S. PATENT DOCUMENTS

| | | | |
|---|---|---|---|
| 8,408,363 B2* | 4/2013 | Richard | B60K 17/28 |
| | | | 184/35 |
| 2013/0228411 A1 | 9/2013 | Wesley et al. | |
| 2017/0241538 A1* | 8/2017 | Tokozakura | F16H 57/0434 |
| 2018/0274662 A1* | 9/2018 | Spangler | B60K 6/387 |
| 2019/0093677 A1* | 3/2019 | Ohgata | F15B 11/17 |
| 2019/0359054 A1 | 11/2019 | Petersen et al. | |
| 2021/0140359 A1* | 5/2021 | Bonte | F16H 57/0442 |
| 2021/0270361 A1* | 9/2021 | Maurer | F16H 57/0435 |
| 2022/0074484 A1* | 3/2022 | Reid | B60K 17/22 |

FOREIGN PATENT DOCUMENTS

| | | | | |
|---|---|---|---|---|
| DE | 42 38 256 A1 | 5/1993 | | |
| DE | 10 2008 033 434 A1 | 4/2009 | | |
| DE | 10 2015 220 888 A1 | 4/2017 | | |
| JP | H08-135836 A | 5/1996 | | |
| WO | 2007/108805 A1 | 9/2007 | | |
| WO | WO-2014030528 A1 * | 2/2014 | | B60K 6/445 |
| WO | WO-2020059786 A1 * | 3/2020 | | F16H 57/0435 |

OTHER PUBLICATIONS

Sun Hydraulics Product Catalog, 3-Way Flow Control Valve, Fixed Orifice, Model FRBA, snhy.com/FRBA, 2019.

\* cited by examiner

VEHICLE TRANSMISSION WITH A LUBRICATION SYSTEM AND A CONNECTION FOR ATTACHING A POWER TAKE-OFF MODULE TO THE VEHICLE TRANSMISSION

This application claims priority from German patent application serial no. 10 2021 201 286.8 filed Feb. 11, 2021.

FIELD OF THE INVENTION

The invention relates to a vehicle transmission which comprises a lubrication system and a connection for the attachment of a power take-off module to the vehicle transmission when necessary.

BACKGROUND OF THE INVENTION

Vehicle transmissions with a lubrication system and a connection for attaching a power take-off module to the vehicle transmission are already known as such. Corresponding power take-off modules for attachment to vehicle transmissions are also known. When necessary, such a power take-off module can be arranged on a power take-off of the vehicle transmission when an auxiliary aggregate of the vehicle is to be driven thereby. The purposes of such auxiliary aggregates are wide-ranging. For example, the power take-off can drive a high-pressure pump of a fire engine, a canal-dredging vehicle or a mobile concrete pump. It is also possible to drive an electric generator of the vehicle by means of the power take-off.

If no power take-off module is arranged on the vehicle transmission, the connection on the vehicle transmission for the power take-off module is normally closed, for example by a housing cover.

DE 10 2008 033 434 A1, for example, discloses an automatic transmission with a housing cover. The transmission housing has an opening for the attachment of a PTO unit. The opening is surrounded by a fixing surface. A cover of the opening is removed when the PTO unit is fitted onto the transmission.

DE 42 38 256 C2 discloses a PTO transmission with a lubricant pump of its own. The PTO transmission is attached to a main transmission in order to drive the PTO transmission. According to FIG. 3 thereof, the PTO transmission is fixed to a transmission housing from which it draws lubricant.

U.S. Pat. No. 3,540,297 A discloses a power take-off device for use with a transmission. The power take-off device has a lubrication system with a hydraulic connection. By way of the hydraulic connection lubricant is supplied to the lubrication system of the power take-off device.

US 2013/0228411 A1 discloses a PTO device with a lubrication system. The PTO device is designed to be attached to a transmission. By way of a lubricant connection a lubricant pump of the transmission supplies the lubricant system of the PTO device. When the pump is operating, a hydraulic accumulator of the PTO device is charged. The accumulator can then supply the PTO device with lubricant when the lubricant pump of the transmission is not operating. An optional throttle arranged within the lubrication system of the PTO device limits a through-flowing quantity of lubricant. An optional non-return valve arranged within the lubrication system of the PTO prevents lubricant from flowing back out of the accumulator into the transmission housing when the lubricant pump of the transmission is not operating.

SUMMARY OF THE INVENTION

The purpose of the present invention is to improve upon the prior art. In particular, a vehicle transmission with an interface for a power take-off module should be provided, such that via the interface a power take-off module arranged on the transmission can be supplied with lubricant as necessary.

This objective is achieved by the features indicated in the principal claim. Preferred embodiments thereof emerge from the subordinate claims.

According to these, a vehicle transmission is proposed which comprises at least a lubrication system and a connection for the attachment of a power take-off module to the vehicle transmission. The power take-off module can in particular be attached to the transmission by means of this connection. In particular, the connection is designed such that the power take-off module can be attached to the transmission when necessary and can then be used in combination with the transmission. For the connection, appropriate interfaces are provided on the vehicle transmission for the power take-off module. In particular a housing opening is provided in the transmission housing byway of which the power take-off module can be coupled mechanically with the power flow in the vehicle transmission. The transmission can also be used without the power take-off module, so the connection is then unused or deactivated. For example, the housing opening of the transmission housing provided for the power take-off module can be closed by a housing cover.

The lubrication system of the vehicle transmission is designed to lubricate both the vehicle transmission and also the power take-off module when the power take-off module is fitted on the vehicle transmission. Correspondingly, the vehicle transmission is designed to deliver lubricant out of the vehicle transmission to the so that the power take-off module too is lubricated. Accordingly the power take-off module needs no separate lubrication system and no separate lubricant pump. When no power take-off module is attached to the transmission, the lubricant remains in the vehicle transmission. In particular, the lubrication system lubricates bearings, meshing teeth and/or shifting elements.

The lubrication system of the vehicle transmission has a pressure feed and a lubricant line fed with lubricant from the pressure feed.

The pressure feed serves to deliver the lubricant into the transmission lubrication system, i.e. also into the lubricant line. The pressure feed provides the required lubricant pressure in the lubrication system. The pressure feed consists in particular of a lubricant pump of the vehicle transmission. In particular the lubricant pump is an integral part of the vehicle transmission. For example, it can be a mechanical or an electric lubricant pump.

The lubricant line has a first section and a second section. In particular, beyond a branching point these sections extend separately from one another. The first section leads to at least one lubrication point of the vehicle transmission, such as a shaft bearing, meshing teeth or a shifting element of the transmission. The second section leads to a lubricant tapping point of the transmission for the power take-off module. The lubricant tapping point constitutes an interface of the transmission for supplying the power take-off module with lubricant from the transmission. Accordingly the lubricant tapping point is designed to couple the lubrication system of the transmission to the power take-off module. In particular the lubricant tapping point is designed to be closed, for example by means of a plug or screw or screwed cover, when no power take-off module is connected to the transmission.

It is provided that within the second section of the lubricant line, i.e. in the flow direction ahead of the lubricant tapping point, a throttle is arranged and also a first valve connected fluidically parallel to the throttle. Thus, the throttle and the first valve both lead to the lubricant tapping point.

The throttle produces a defined flow resistance in the second section. This restricts the lubricant flow that can be delivered to the lubricant tapping point, bypassing the first valve. The throttle is formed in particular by a diaphragm arranged in the lubricant line.

The first valve is designed to open in the direction toward the lubricant tapping point if the lubricant pressure rises to a first pressure level. Thus, the first valve does not open immediately when a lubricant flows in the direction of the lubricant tapping point, but rather, only when the first pressure level upstream from the valve has been reached. Thus, the valve is normally closed.

By virtue of the parallel connection of the throttle and the first valve, when the lubricant pressure is below the first pressure level a minimum quantity of lubricant can always flow out of the transmission lubrication system via the lubricant tapping point into the power take-off module, bypassing the first valve. In this case the throttle prevents the lubricant pressure in the lubrication system from falling by an undesirably large amount. The minimum quantity ensures the basic lubrication of the power take-off module when the load on the power take-off module is low. Such a load situation with reduced loading of the power take-off module exists, in particular, when the power take-off module is decoupled from the transmission and/or when the auxiliary aggregate driven by the power take-off module is switched off. When the pressure level in the transmission lubrication system is selectively increased to or above the first pressure level, the first valve opens. Thereby, a corresponding additional lubricant flow is delivered via the lubricant tapping point to the power take-off module. This increased quantity ensures lubrication of the power take-off module when the power take-off module is under higher load. Such a loading situation with higher load exists in particular when the power take-off module is coupled to the transmission and/or when the auxiliary aggregate driven by the power take-off module is switched on or is operating under load.

In this case the throttle and the first valve are parts of the vehicle transmission. In that way the power take-off module can be made more simple. This also ensures that despite the attachment of the power take-off module, the transmission is supplied with a sufficient amount of lubricant at a high enough pressure. At the same time, the power take-off module arranged on the transmission is supplied with lubricant from the transmission. This is achieved regardless of the type of power take-off module used. Consequently a multiplicity of power take-off module types can be used with the vehicle transmission.

These advantages should in particular be seen against the background that power take-off modules are often produced by third-party manufacturers. Power take-off modules are usually only attached by a vehicle manufacturer or vehicle equipment provider, as a function of the intended use of the vehicle, to the transmission already perhaps built into the vehicle. It is also possible that a power take-off module is only built into the vehicle if and when the intended use of the vehicle changes.

Preferably, the first valve only opens in the direction of the lubricant tapping point. It then blocks the flow in the opposite direction. In that way any flow-back of lubricant out of the power take-off module into the second section of the lubricant line is made more difficult. Thus, the first valve is in particular a non-return valve. In this context the closing element of the first valve is in particular pre-stressed in the closed position by a spring element. At the aforesaid first pressure level that pre-stress is overcome, so that the closing element is moved out of the closed position in order to open the valve.

Preferably, the vehicle transmission has a plurality of optionally engaged transmission ratios (gears), in particular several forward gears and at least one reversing gear. To engage these gears the transmission comprises shifting elements, in particular shifting clutches. In particular, the gears can be engaged automatically. Correspondingly, the vehicle transmission can be a so-termed automatic transmission or an automated change-speed transmission. The shifting elements can be actuated electrically, mechanically, hydraulically or pneumatically. When hydraulically actuated shifting elements are used, it is in particular provided that the actuation takes place by means of the lubricant present in the lubrication system.

The vehicle transmission is provided in particular for use in a drive-train of a motor vehicle, i.e. a passenger car or a truck or a powered omnibus. However, the vehicle transmission can also, for example, be provided for use in a rail vehicle or an agricultural vehicle.

Preferably, the vehicle transmission has a drive input shaft and a drive output shaft. The input shaft of the vehicle transmission serves to transmit a drive torque into the transmission. The drive torque is generated by a drive motor and transmitted to the input shaft of the transmission. Accordingly, the input shaft is designed in particular to be drivingly connected to the drive motor. Typically, the drive motor is in the form of an internal combustion engine or an electric motor. Between the input shaft and the drive motor a starting clutch can be provided, in particular a hydrodynamic torque converter. The drive output shaft of the transmission serves primarily to pass the drive torque, after being geared up or down by the vehicle transmission, out of the transmission in order to propel the vehicle. In that way a correspondingly increased or reduced drive torque can be delivered to drive wheels of the vehicle.

As explained earlier, the vehicle transmission has appropriate interfaces for the connection of the power take-off module. One of these interfaces forms the aforesaid lubricant tapping point. Through this the lubricant can be fed from the transmission into the power take-off module. A further interface can be formed by the aforesaid opening in the transmission housing. This can be in the form of a flange onto which the power take-off module can be fixed in order to attach it to the transmission.

A further interface of the transmission serves for the driving connection of the power take-off module to the power flow in the vehicle transmission—also just called the power take-off in what follows. This power take-off includes in particular a power take-off gearwheel of the vehicle transmission specially provided for the purpose. The power take-off gearwheel is mechanically coupled to a corresponding gearwheel of the power take-off module when the power take-off module is arranged on the vehicle transmission. The power take-off gearwheel is or can be, for example, coupled in a rotationally fixed manner with the input shaft or with the output shaft or with the drive motor.

Preferably, the lubricant line comprises a third section. The third section leads to a lubricant reservoir of the lubrication system. The lubricant reservoir is in particular a lubricant sump of the transmission. In particular the lubricant reservoir is connected unpressurized. Thus, the pressure of the lubricant in the lubricant reservoir corresponds to the atmospheric pressure in the surroundings of the vehicle transmission. A second valve is arranged in the third section. The second valve is designed to open in the direction of the lubricant reservoir if the lubricant pressure increases to a second pressure level. Thus, the second valve does not open immediately when lubricant flows in the direction of the lubricant reservoir, but rather, only when the second pressure level is reached. Accordingly, the second valve is in particular normally closed. The second valve ensures that the pressure in the lubricant line does not increase excessively. When the second pressure level is reached, the excess pressure in the lubrication system is reduced in the lubricant reservoir.

Preferably, the second valve only opens in the direction of the lubricant reservoir. It then blocks any flow in the opposite direction. In that way any penetration of air or lubricant into the third section of the lubricant line is prevented. Thus, in particular the second valve is a non-return valve. In this case the closing element of the second valve is in particular pre-stressed in the closed position by a spring element. This pre-stress is overcome at the second pressure level, so that the closing element is moved away from the closing position and the valve opens.

The first and/or second valve(s) is/are in the form of plate valves. Plate valves have been found to be particularly suitable for this purpose. In a plate valve a plate-shaped closing element is provided. The closing element can move between a closing position and an opening position. In the closing position the closing element is in contact with a valve seat and thereby closes the valve, while in contrast, in the open position it is lifted clear of the valve seat so as to uncover a through-flow opening. Preferably, the closing element is arranged directly in the respective section of the lubricant line so as to form the valve concerned. In that way the number of components required can be kept small.

The throttle is preferably formed by an opening, for example a bore in the closing element of the first valve. Thus, the throttle is formed directly in the closing element. In that way the valve and the throttle can be made particularly simply. For example, the throttle is contained as an opening in the plate-shaped closing element of the plate valve.

Preferably the first pressure level, at which the first valve opens, is lower than the second pressure level at which the second valve opens. In that way the lubrication system can on the one hand be operated with a low pressure (first operating pressure) which is lower than the first pressure level. The power take-off module is then supplied with a small lubricant flow, bypassing the first valve via the throttle. And on the other hand the lubrication system can be operated with a high operating pressure, which is above the first pressure level and below the second pressure level. Then, the power take-off module is supplied via the throttle and the first valve with a larger lubricant flow. In this case the second valve is still closed, which prevents a pressure loss in the lubricant line to the lubricant reservoir. If the pressure is increased to the second (maximum) pressure level or above it, the second valve then opens whereby any further pressure increase in the lubricant line is limited.

Preferably, the pressure difference between the first pressure level and the second pressure level is less than 0.5 bar. In that way the applied pressure can be adjusted very precisely for supplying the power take-off module with lubricant just as required. In particular, the first pressure level is at around 0.9 to 1.0 bar (relative pressure) and the second pressure level is at around 1.1 to 1.2 bar (relative pressure).

In an embodiment the second section of the lubricant line is fluidically connected in parallel to the third section. Thus, the lubricant line branches into the second section and the third section. In that way the throttle and the fist valve and the second valve are fluidically connected in parallel to one another, in such manner that the throttle and the first valve each lead to the lubricant tapping point and the second valve leads to the lubricant reservoir.

In another embodiment the second section of the lubricant line is fluidically connected in series with the second section of the lubricant line. In this case the lubricant tapping point for the power take-off module is fluidically connected between the second section and the third section. The lubricant tapping point is thus fluidically between the first valve and the throttle on the one hand, and the second valve on the other hand.

Preferably, the vehicle transmission has a control unit. This control unit is in particular designed to actuate shifting elements of the vehicle transmission. In particular the shifting elements are actuated by the control unit in such manner that a gear ratio adapted to the situation at the time is engaged automatically. The control unit is preferably an integral part of the vehicle transmission. The control unit comprises in particular a microcontroller which evaluates signals and carries out commands. In particular, the control unit comprises inputs and outputs in order to receive information and emit control signals. In particular the control unit comprises a data memory in which the commands are stored.

Preferably, the power take-off module can optionally be coupled into the power flow in the vehicle transmission and decoupled therefrom by means of a shifting clutch. The shifting clutch can be part of the vehicle transmission or of the power take-off module. The shifting clutch is for example in the form of a claw clutch or a frictional clutch. Preferably, the shifting clutch is actuated by the control unit of the vehicle transmission. By virtue of the coupling the power take-off module is coupled mechanically with the power take-off of the transmission and can be driven by it. Thereby, the power take-off module is loaded and then requires increased lubrication. The same applies when the auxiliary aggregate driven by the power take-off module is switched on or loaded to a sufficient extent. By virtue of the decoupling the power take-off module is mechanically decoupled from the power take-off of the transmission and can no longer be driven thereby. Then the load on the power take-off module is reduced and it only requires less lubrication. The same applies when the auxiliary aggregate driven by the power take-off module is switched off or when the load on it is small.

In particular the control unit is designed to recognize the load condition with elevated loading of the power take-off module. In particular that loading situation exists when the power take-off module is coupled to the power flow in the vehicle transmission (the shifting clutch is closed) and/or when the auxiliary aggregate driven by the power take-off module is switched on and/or when this auxiliary aggregate is operated at least with a certain load. Thus, the control unit is in particular designed to recognize this. The control unit is then also designed, when it recognizes such an elevated load condition, to increase the pressure in the lubricant line at least to the first pressure level. The first valve then opens, whereby the higher lubricant flow passes through the throttle and the first valve to the lubricant tapping point for the power take-off module. In particular, the control unit is designed during this to increase the pressure in the lubricant line to a value lower than the second pressure level. This prevents any unused lubricant from draining away through the second valve into the reservoir. The pressure in the lubricant line is for example increased if the control unit brings about a controlled increase of the rotation speed of the lubricant pump. Alternatively or in addition, the control unit can vary the setting of an adjustable pressure-limiting valve in the lubricant line in an appropriate manner.

In particular the control unit is designed to recognize the load condition when the power take-off module is under a reduced load. That load condition exists in particular when the power take-off module is decoupled from the power flow in the vehicle transmission (the shifting clutch is open) and/or when the auxiliary aggregate driven by the power take-off module is switched off and/or when the auxiliary aggregate is operated below the specified load. Thus, in particular the control unit is designed to recognize this. The control unit is then also designed, when such a reduced load condition is recognized, to reduce the pressure in the lubricant line to a value below the first pressure level. In this case the first valve closes, so that only the reduced lubricant flow still gets through the throttle to the lubricant tapping point for the power take-off module. The reduction of the pressure in the lubricant line takes place, for example, if the control unit reduces the rotation speed of the lubricant pump in a controlled manner. Here too, alternatively or in addition, the control unit can vary the setting of an adjustable pressure-limiting valve in the lubricant line appropriately.

BRIEF DESCRIPTION OF THE DRAWINGS

Below, the invention is explained in greater detail with reference to figures from which further preferred embodiments of the invention emerge. The figures show, in each case in a schematic representation.

DETAILED DESCRIPTION OF THE PREFERRED EMBODIMENTS

In the figures, the same or at least functionally equivalent components are denoted by the same indexes.

Figure 1:
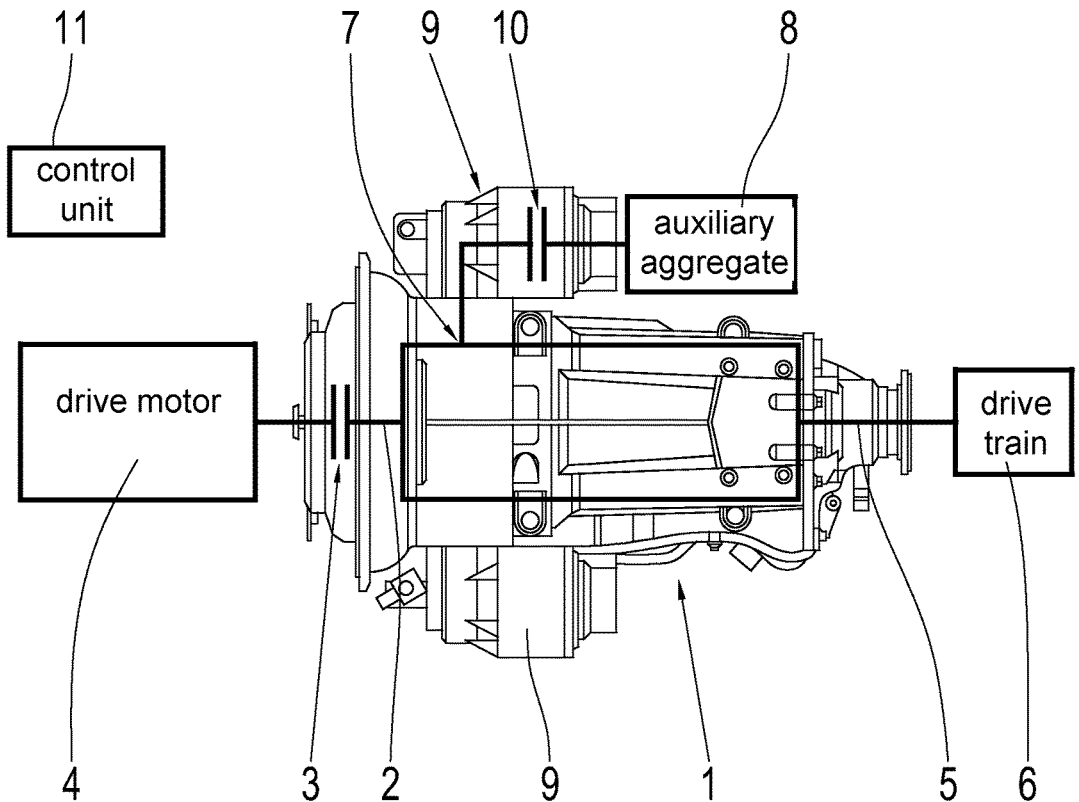
FIG. 1: A view from above of a vehicle transmission with power take-off modules arranged on it.

FIG. 1 shows a view from above of a vehicle transmission 1, for example in the form of an automatic transmission. The input shaft 2 of the transmission 1 can be coupled by means of a starting clutch 3 to a drive motor 4. The starting clutch 3 is in particular in the form of a hydrodynamic torque converter. The output shaft 5 of the transmission 1 is coupled to a vehicle drive-train 6 of customary type, in order to power the drive wheels of the vehicle. Thus, the vehicle can be propelled by means of the drive motor 4 and the transmission 1.

In addition the transmission has a power take-off 7. In that way an auxiliary aggregate 8 separate from the transmission 1 can be driven by means of the drive motor 4 and the transmission 1, for example a high-pressure pump or an electric generator. For that purpose, laterally on the transmission 1 a power take-off module 9 is fixed onto a connection of the transmission 1 provided for the purpose, and is coupled to the power take-off 7. Here, the power take-off module 9 projects through a housing opening of the transmission housing into the transmission 1 and, inside the transmission 1, it is coupled to the power flow in the transmission 1. From there the power take-off module 9 leads the power flow at least partially out of the transmission 1 and to the auxiliary aggregate 8.

When there is no auxiliary aggregate 8, the power take-off module 9 is omitted or removed from the transmission 1. The connection of the transmission 1 for the power take-off module 9 is then unused. The associated housing opening in the transmission housing is then usually closed by a transmission cover.

By means of a shifting clutch 10 the power take-off module 9 and thus also the aggregate 8 can be coupled to and decoupled from the power flow in the transmission 1. Depending on the shift condition of the shifting clutch 10, the power take-off module 9 is thus coupled to the transmission 1 (shifting clutch 10 closed) or decoupled from the transmission 1 (shifting clutch 10 open). When the power take-off module 9 is coupled, the aggregate 8 can be driven by the power take-off 7, which is not the case when the power take-off module 9 is decoupled. In the coupled condition the power take-off module 9 is under higher load than in the decoupled condition. This also applies when the aggregate 8 is switched on or when the aggregate is operated with at least a certain load. In that case the power take-off module 9 is in the loaded condition under elevated load. The power take-off module 9 then needs more lubricant.

The lubricant for the power take-off module 9 is drawn from the lubrication system of the transmission 1. As an example, in FIG. 1 the shifting clutch 10 is arranged within the power take-off module 9. It forms a part of the power take-off module 9. However, the shifting clutch 10 can also be arranged in the transmission 1 and form part of the transmission 1.

In particular, the shifting clutch 10 is actuated by the control unit 11 of the transmission 1. Preferably, the control unit 11 recognizes the shift condition of the shifting clutch 10, i.e. whether the power take-off module 9 is coupled to or decoupled from the transmission 1 by it. Preferably, the control unit 11 also recognizes whether the aggregate 8 is switched on or off. Preferably, the control unit 11 also recognizes the current load condition of the aggregate 8. The control unit 10 is in particular designed to actuate the shifting elements of the transmission 1. In particular, the gears of the transmission 1 are optionally engaged by means of the shifting elements. In particular, the control unit 10 is an integral part of the transmission 1.

Figure 2:
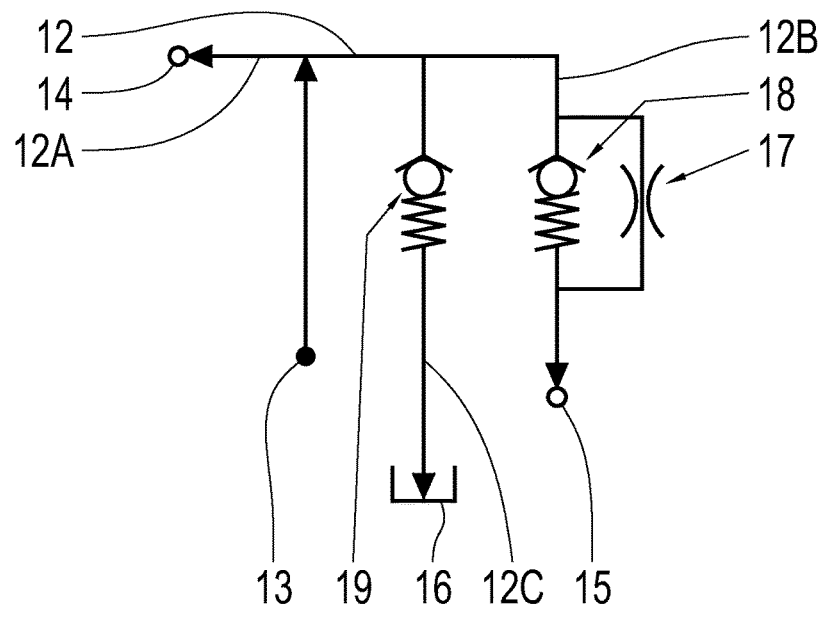
FIG. 2: A section of a first embodiment of the lubrication system of the vehicle transmission represented in FIG. 1, FIG. 3: A section of a second embodiment of the lubrication system of the vehicle transmission represented in FIG. 1, FIG. 4: A cross-section through a lubricant line of a lubrication system of a vehicle transmission.
Figure 3:
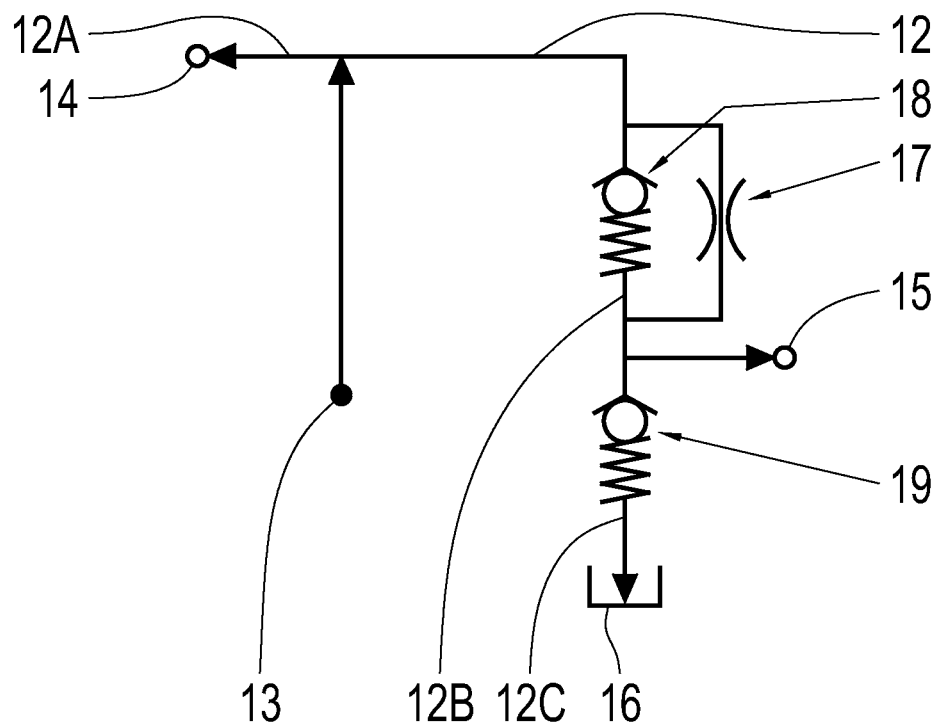

Below, the lubrication system of the transmission 1 is explained in greater detail with reference to FIGS. 2 and 3. FIGS. 2 and 3 show, respectively, a section of different embodiments of the lubrication system.

The lubrication system has a lubricant tapping point 15 for the power take-off module 9. Thus, the lubricant tapping point 15 forms the interface of the transmission 1 for transferring lubricant from the lubrication system of the transmission 1 to the power take-off module 9. The necessary lubricant pressure in the lubrication system is provided by a pressure feed of the transmission 1, in particular by means of the transmission oil pump. It is advantageous for the lubrication system of the transmission 1 to supply the power take-off module 9 with lubricant according to need.

To achieve this it is proposed that in the flow direction upstream from the tapping point 15 there are arranged a throttle 17 and a first valve 18 connected in parallel with the throttle 17. The valve 18 is designed to open in the direction toward the lubricant tapping point 15 when the lubricant pressure increases to a first pressure level.

In this way, when the loading of the power take-off module 9 is low the basic supply of the power take-off module 9 with lubricant takes place at a low, first operating pressure via the throttle 17. Regardless of the type of power take-off module 9, the throttle 17 prevents an unacceptably large pressure drop in the lubrication system of the transmission 1. In particular, the throttle 17 is in the form of a diaphragm and cannot be adjusted. During this the valve 18 is closed.

When the loading of the power take-off module 9 increases, the lubricant pressure rises to a second, elevated operating pressure of at least the first pressure level, so that the valve 18 opens. This increases the lubricant flow passing to the lubricant tapping point 15 since the lubricant now flows in by way of both the throttle 17 and the first valve 18. Consequently, this covers the greater need of the power take-off module 9 for lubricant. The control unit 11 brings about this increasing and reduction of the operating pressure in the lubrication system when it detects the corresponding load condition of the power take-off module 9.

FIG. 2 shows a section of a first variant of the lubrication system. The lubrication system comprises the lubricant line 12. This is supplied from the pressure feed 13 of the transmission 1 with lubricant at a first lubricant pressure. The lubricant line 12 has a number of sections 12A, 12B and 12C.

The first section 12A is designed to pass the lubricant to at least one lubrication point 14 of the transmission 1, for example to a bearing of a transmission shaft. The first section 12A can be designed in any suitable way for lubricating the lubrication point 14. Accordingly, in what follows the first section 12A will be discussed no further.

The second section 12B is designed to pass the lubricant to the lubricant tapping point 15 of the transmission 1 for the power take-off module 9. The throttle 17 and the first valve 18 are arranged in the second section 12B. The throttle 17 and the valve 18 are connected parallel to one another. Thus, the second section 12B consists of two part-lines which branch away from one another ahead of the throttle 17 and the valve 18 and which merge together again after the diaphragm 17 and the valve 18. The first valve 18 opens in the direction of the tapping point 15 when the first pressure level is reached, for example at a relative pressure of 0.9 bar. In this case the first valve 18 is in the form of a non-return valve, so it blocks in the opposite direction. The throttle 17 comprises for example a throttle bore with a fixed diameter of 1 mm for the lubricant.

The third section 12C is designed to pass the lubricant to the lubricant reservoir 16 of the transmission 1, for example the transmission oil sump. The reservoir 16 is vented. Thus, the pressure in the reservoir 16 corresponds to the ambient pressure. In contrast, the lubricant pressure provided by the pressure feed 13 is elevated. The third section 12C is connected parallel to the second section 12B. Thus, the sections 12B and 12C branch away from one another ahead of the throttle 17 and the valve 18. A second valve 19 is arranged in the third section 12C. This valve 19 opens in the direction toward the reservoir 16 at a second pressure level, for example at a relative pressure of 1.1 bar. Here, the second valve 19 is a non-return valve. Thus, in the opposite direction it blocks. The second pressure level is higher than the first pressure level at which the first valve 18 opens.

At a first operating pressure of the lubrication system which is lower than the first pressure level, both valves 18, 19 are closed. This first operating pressure is produced by the transmission control unit during the operation of the transmission 1 when the control unit recognizes that the load on the power take-off module 9 is low, for example because the shifting clutch is or will be open. When the pressure increases to the second, higher operating pressure the first valve 18 opens. This second operating pressure is produced by the control unit during the operation of the transmission 1 when the control unit recognizes that the load on the power take-off module 9 has increased, for example because the shifting clutch is or will be closed. A further pressure increase causes the second valve 19 as well to open. Then, as a safety measure the second valve 19 releases excess lubricant pressure into the reservoir 16.

FIG. 3 shows a section of a second variant of the lubrication system. The way it works corresponds to the lubrication system shown in FIG. 2. The only difference compared with FIG. 2 is that in FIG. 3 the third section 12C of the lubricant line 12 is connected in series with the second section 12B. Thus, the tapping point 15 for the power take-off module 9 is located between the second section 12B and the third section 12C. In other respects the explanations relating to FIGS. 1 and 2 apply also to FIG. 3.

Figure 4:
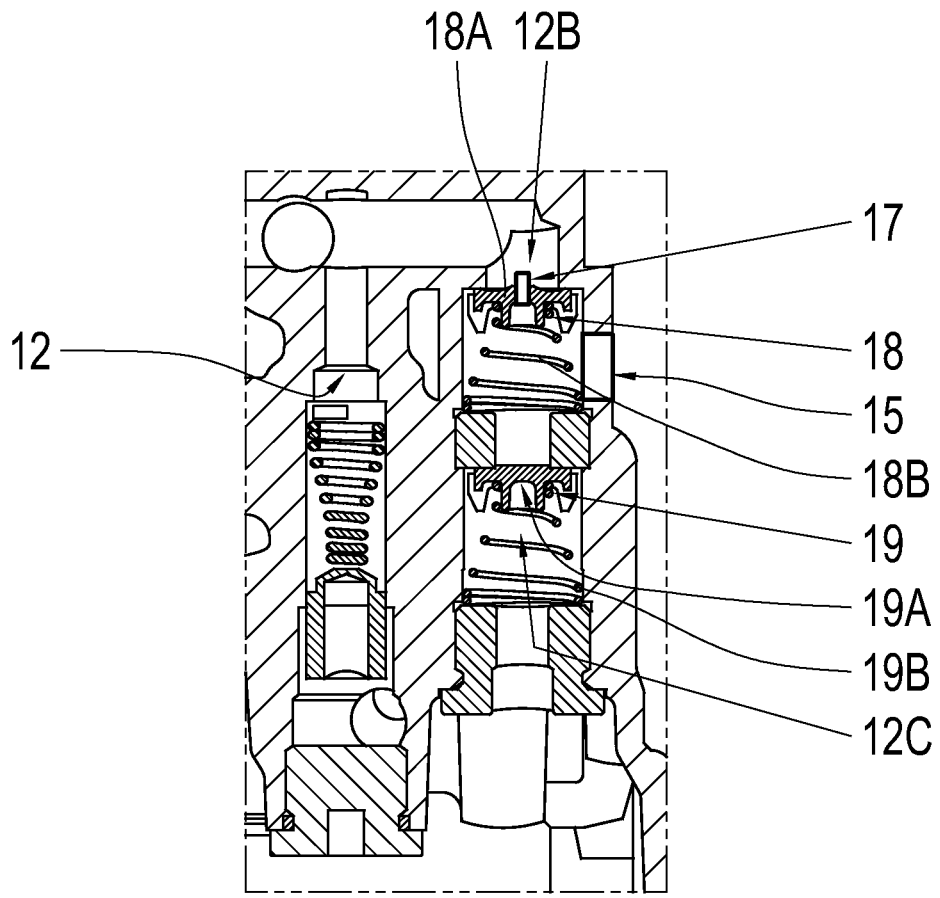

FIG. 4 shows as an example a section through a transmission with a lubrication system according to FIG. 3. In this case the lubricant line 12 is formed at least partially inside a housing wall of the transmission. The valves 18 and 19 are in the form of plate valves.

The lubricant tapping point 15 is formed by an opening (15) in the lubricant line 12 arranged between the valves 18, 19. The power take-off module 9 is connected to the opening (15), so that the lubricant can get to the power take-off module 9 from the second section 12B of the lubricant line 12 via the opening (15). When no power take-off module 9 is attached to the transmission, the opening (15) is closed, for example by a screw or a plug.

The valves 18, 19 are formed by the plate-shaped closing elements 18A, 19A and spring elements 18B, 19B arranged directly inside the line 12. The closing elements 12A, 19A are pressed against the associated valve seat in the respective blocking direction of the valve 18, 19 by the pre-stressed spring element 18B, 19B.

The pre-stress of the first spring element 18B acting upon the closing element 18A is overcome when pressure at the first pressure level is applied at the inlet side of the first valve 18. The closing element 18A then lifts clear of its valve seat, whereby lubricant can pass out of the second section 12B through the valve 18 to the lubricant tapping point 15.

The pre-stress of the second spring element 19B acting upon the closing element 19A is overcome when pressure at the second pressure level is applied at the inlet side of the second valve 19. The closing element 19A then lifts clear of its valve seat, whereby lubricant can flow away through the valve 19 out of the second section 12B and via the third section 12B into the reservoir. In that way the lubricant pressure at the lubricant tapping point 15 is limited.

The throttle 17 is realized by making a throttle bore in the closing element 18A. Through this a certain lubricant flow always gets to the lubricant tapping point 15, so the sealing action of the closing element 18A is bypassed. In that way, as shown in FIG. 3, the first valve 18 and the throttle 17 are fluidically connected in parallel with one another. The second valve 19 is located after the throttle 17 and the first valve 18 in the flow direction. Thus, the second valve 19 is connected in series with the first valve 18 and the throttle 17.

By virtue of the integration of this circuit in the lubrication system of the transmission 1, numerous types of power take-off modules 9 can be supplied with lubricant according to need.

INDEXES

1 Vehicle transmission
2 Input shaft
3 Starting clutch
4 Drive motor
5 Output shaft
6 Remainder of the vehicle drive-train
7 Power take-off
8 Auxiliary aggregate
9 Power take-off module
10 Shifting clutch
11 Control unit
12 Lubricant line
12A First section of the lubricant line 12
12B Second section of the lubricant line 12
12C Third section of the lubricant line 12
13 Pressure feed, transmission oil pump
14 Lubrication point
15 Lubricant tapping point
16 Lubricant reservoir
17 Throttle, diaphragm
18 Valve, non-return valve
18A Closing element
18B Spring element, compression spring
19 Valve, non-return valve
19A Closing element
19B Spring element, compression spring

The invention claimed is:

1. A vehicle transmission comprising:
a transmission input being connectable to a drive motor such that the vehicle transmission is driveable by the drive motor,
a lubrication system,
a connection for attachment of a power take-off module to the vehicle transmission such that the power take-off module is driveable by the vehicle transmission,
the lubrication system being designed to lubricate the vehicle transmission and, when the power take-off module is arranged on the vehicle transmission, to lubricate the power take-off module,
the lubrication system having a pressure feed and a lubricant line fed with lubricant from the pressure feed, the lubricant line leading, via a first section, to at least one lubrication point of the vehicle transmission and, via a second section, to a lubricant tapping point for the power take-off module,
wherein a throttle and a first valve, connected in parallel with the throttle, are arranged in the second section, and
the first valve is designed to open in a direction toward the lubricant tapping point when lubricant pressure rises to a first pressure level,
a third section of the lubricant line leads into a lubricant reservoir of the lubrication system,
a second valve is arranged in the third section, the second valve is designed to open in a direction toward the lubricant reservoir when the lubricant pressure rises to a second pressure level,
the second section is connected in series with the third section, and the lubricant tapping point is connected between the second section and the third section, and
wherein the first pressure level is lower than the second pressure level.

2. The vehicle transmission according to claim 1, wherein a pressure difference between the first pressure level and the second pressure level is smaller than 0.5 bar.

3. The vehicle transmission according to claim 1, wherein the throttle is formed by an opening in a closing element of the first valve.

4. The vehicle transmission according to claim 1, further comprising a control unit which is designed to recognize a loading condition with an elevated load on the power take-off module and thereupon to increase pressure in the lubricant line at least to the first pressure level.

5. The vehicle transmission according to claim 1, wherein the first valve is a first non-return valve connected in parallel with the throttle and the second valve is a second non-return valve.

6. The vehicle transmission according to claim 1, comprising a control unit which is designed to recognize a loading condition with a reduced load on the power take-off module and thereupon to reduce lubricant pressure in the lubricant line to below the first pressure level.

7. The vehicle transmission according to claim 6, wherein the control unit is designed to actuate a shifting clutch so as to couple and decouple the power take-off module to and from power flow in the vehicle transmission.

8. The vehicle transmission according to claim 1, wherein the first valve is a first non-return valve connected in parallel with the throttle.

9. The vehicle transmission according to claim 1, wherein the second valve is a second non-return valve.

* * * * *